US012675227B2

(12) United States Patent
Lim et al.

(10) Patent No.: US 12,675,227 B2
(45) Date of Patent: Jul. 7, 2026

(54) MEMORY DEVICE INCLUDING CLOCK SIGNAL CORRECTION CIRCUIT, MEMORY SYSTEM, AND OPERATING METHOD OF MEMORY DEVICE

(71) Applicant: SAMSUNG ELECTRONICS CO., LTD., Suwon-si (KR)

(72) Inventors: Wonmuk Lim, Suwon-si (KR); Seunghwan Hong, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 18/915,763

(22) Filed: Oct. 15, 2024

(65) Prior Publication Data

US 2025/0231693 A1      Jul. 17, 2025

(30) Foreign Application Priority Data

Jan. 16, 2024    (KR) ........................ 10-2024-0006759

(51) Int. Cl.
| | |
|---|---|
| *G06F 12/00* | (2006.01) |
| *G06F 1/08* | (2006.01) |
| *G06F 3/06* | (2006.01) |

(52) U.S. Cl.
CPC .............. *G06F 3/0619* (2013.01); *G06F 1/08* (2013.01); *G06F 3/0659* (2013.01); *G06F 3/0673* (2013.01)

(58) Field of Classification Search
CPC ....... G06F 3/0631; G06F 3/064; G06F 3/0679
USPC ......................................................... 711/154
See application file for complete search history.

(56) References Cited

U.S. PATENT DOCUMENTS

| | | | | |
|---|---|---|---|---|
| 4,698,826 A | * | 10/1987 | Denhez ................. | H04J 3/0614 |
| | | | | 375/357 |
| 7,543,090 B2 | | 6/2009 | Lundberg | |
| 8,324,949 B2 | | 12/2012 | Cherkassky et al. | |
| 9,602,082 B2 | | 3/2017 | Hedayati et al. | |
| 10,256,968 B1 | * | 4/2019 | Wu ......................... | H04L 7/0004 |
| 10,727,826 B2 | * | 7/2020 | Choi ...................... | G11C 7/222 |
| 2007/0182472 A1 | * | 8/2007 | Cho ...................... | H03L 7/0814 |
| | | | | 327/158 |
| 2012/0019299 A1 | * | 1/2012 | McLeod .............. | H03K 5/1565 |
| | | | | 327/175 |
| 2016/0105165 A1 | * | 4/2016 | Shim .................... | H03K 5/1565 |
| | | | | 327/175 |
| 2019/0182024 A1 | | 6/2019 | Tajalli et al. | |
| 2022/0044741 A1 | * | 2/2022 | Kim ....................... | G11C 16/32 |
| 2022/0109434 A1 | * | 4/2022 | Han ......................... | G06F 1/10 |
| 2022/0376677 A1 | * | 11/2022 | You ......................... | H03K 5/135 |

(Continued)

FOREIGN PATENT DOCUMENTS

KR      10-2020-0019379      2/2020

*Primary Examiner* — Mohamed M Gebril
(74) *Attorney, Agent, or Firm* — Fish & Richardson P.C.

(57) ABSTRACT

A memory device includes a clock signal correction circuit, a memory system, and an operating method of the memory device. The memory device may include a first correction circuit configured to adjust phases of first to fourth clock signals and output first to fourth corrected clock signals, a second correction circuit configured to output first to fourth offset clock signals based on a size of each of first to fourth reference data included in a first data signal, and a driver configured to output a second data signal based on the first to fourth corrected clock signals.

20 Claims, 13 Drawing Sheets

220

(56)          References Cited

U.S. PATENT DOCUMENTS

2024/0187204 A1*   6/2024   Hidaka  ................. H04L 7/0029
2025/0231693 A1*   7/2025   Lim  ...................... G06F 3/0673

* cited by examiner

MEMORY DEVICE INCLUDING CLOCK SIGNAL CORRECTION CIRCUIT, MEMORY SYSTEM, AND OPERATING METHOD OF MEMORY DEVICE

CROSS-REFERENCE TO RELATED APPLICATION

This application claims priority to Korean Patent Application No. 10-2024-0006759, filed in the Korean Intellectual Property Office on Jan. 16, 2024, the disclosure of which is incorporated by reference herein in its entirety.

BACKGROUND

A clock signal may provide the timing for circuits included in a memory device to operate. The 4-phase clock signal may include four clock signals each configured to have a phase difference of 90 degrees, and the memory device may perform operations indicated by a memory controller based on the four clock signals.

When the memory device performs a read operation, the 4-phase clock signal may be provided to each element in the memory device along a clock signal path configured in the memory device. During this transmission process, an error may occur in the phase of each clock signal, and as the number of transistors arranged in a path through which a clock signal is transmitted increases, the error may increase.

SUMMARY

In general, in some aspects, the present disclosure is directed toward a memory device configured to operate at an accurate timing by arranging a correction circuit at a position that minimizes an error in a 4-phase clock signal of the memory device, and thus to increase the accuracy of a data signal output from the memory device.

According to some implementations, the present disclosure is directed to a memory device that may include a memory cell array storing first to fourth data, a first correction circuit configured to receive first to fourth clock signals and a control signal, adjust phases of the first to fourth clock signals based on the control signal, and output first to fourth corrected clock signals, a second correction circuit configured to receive the first to fourth clock signals through the first correction circuit, adjust the phases of the first to fourth clock signals based on a size of each of first to fourth reference data included in a first data signal, and output first to fourth offset clock signals, a control circuit configured to generate the control signal based on the first to fourth offset clock signals received from the second correction circuit, and a driver configured to output, based on the first to fourth corrected clock signals received from the first correction circuit, a second data signal including the first to fourth data read from the memory cell array.

According to some implementations, the present disclosure is directed to an operating method of a memory device that may include, based on a first reference clock signal and a second reference clock signal, generating first to fourth clock signals, based on a size of each of first to fourth reference data included in a first data signal, generating first to fourth offset clock signals, generating first to fourth corrected clock signals by adjusting, based on the first to fourth offset clock signals, phases of the first to fourth clock signals, and based on the first to fourth corrected clock signals, outputting a second data signal including data stored in the memory device.

According to some implementations, the present disclosure is directed to a memory system that may include a memory controller configured to generate a first reference clock signal, a second reference clock signal, and a first control signal, and a memory device configured to provide a first data signal and a second data signal to the memory controller, wherein the memory device may include a memory cell array storing first to fourth data, a clock buffer circuit configured to generate first to fourth clock signals, based on the first reference clock signal and the second reference clock signal, a first correction circuit configured to receive the first to fourth clock signals and a second control signal, adjust phases of the first to fourth clock signals based on the second control signal, and output first to fourth corrected clock signals, a second correction circuit configured to receive the first to fourth clock signals through the first correction circuit, adjust the phases of the first to fourth clock signals based on the first control signal, and output first to fourth offset clock signals, a control circuit configured to generate the second control signal based on the first to fourth offset clock signals received from the second correction circuit, and a driver configured to output, based on the first to fourth corrected clock signals received from the first correction circuit, the second data signal including the first to fourth data read from the memory cell array, and the memory controller may be further configured to, based on a size of each of the first to fourth reference data included in the first data signal, generate the first control signal to adjust the phases of the first to fourth clock signals.

BRIEF DESCRIPTION OF THE DRAWINGS

Example implementations will be more clearly understood from the following detailed description, taken in conjunction with the accompanying drawings.

DETAILED DESCRIPTION

Figure 1:
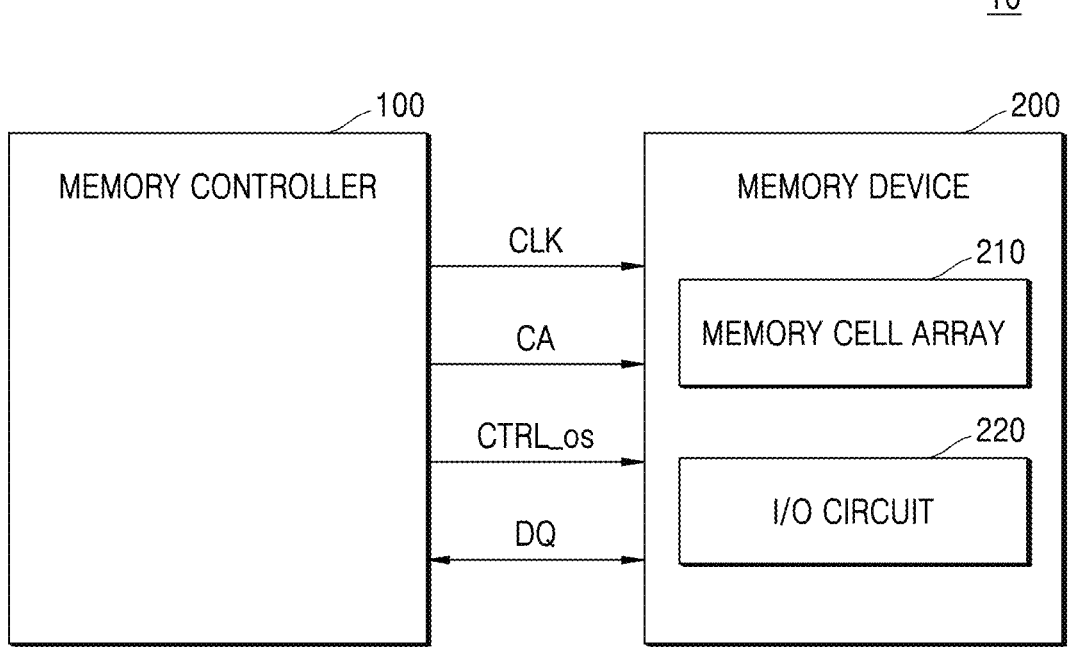
FIG. 1 is a block diagram of an example of a memory system according to some implementations.

Hereinafter, example implementations will be described in detail with reference to the accompanying drawings. When the embodiments are described with reference to the drawings, those elements that are the same or are in correspondence are rendered the same reference numerals, and redundant descriptions thereof are omitted.

FIG. 1 is a block diagram of an example of a memory system according to some implementations. In FIG. 1, a memory system 10 may be referred to as a computing device, such as an integrated circuit, an electronic device or system, a smartphone, a table personal computer (PC), a computer, a server, a workstation, a mobile communication terminal, a personal digital assistant (PDA), a portable multimedia player (PMP), and other suitable computers, a virtual machine, or a virtual computing device thereof. In some implementations, the memory system 10 may be part of elements included in a computing system, such as a graphics card. According to some implementations, the memory system 10 may be implemented as an unbuffered dual in-line memory module (UDIMM), registered DIMM (RDIMM), load reduced DIMM (LRDIMM), fully buffered DIMM (FBDIMM), small outline DIMM (SODIMM), or like.

The memory system 10 may include a memory controller 100 and a memory device 200. The memory controller 100 may provide, to the memory device 200, a clock signal CLK, a command/address signal CA, an offset control signal CTRL_os, and a data signal DQ. The memory controller 100 may be communicatively connected to the memory device 200 through a memory bus. The clock signal CLK, the command/address signal CA, the offset control signal CTRL_os, and the data signal DQ may be provided between the memory controller 100 and the memory device 200 through a single signal line. Signal lines between the memory controller 100 and the memory device 200 may be connected through connectors. The connectors may be implemented as pins, balls, signal lines, or other hardware components. The data signal DQ may be transmitted from the memory controller 100 to the memory device 200 or from the memory device 200 to the memory controller 100.

In some implementations, when the memory controller 100 reads data stored in the memory device 200, the memory device 200 may provide, to the memory controller 100, a data signal DQ including data read according to the clock signal CLK.

The memory controller 100 may generate an offset control signal CTRL_os based on the size of data included in the data signal DQ received from the memory device 200. The memory controller 100 may adjust phases of clock signals within the memory device 200 through the offset control signal CTRL_os. A description regarding the offset control signal CTRL_os will be provided below with reference to FIG. 5.

The memory device 200 may include a memory cell array 210 and an input/output (I/O) circuit 220. The memory cell array 210 may include a plurality of word lines, a plurality of bit lines, and a plurality of memory cells. The plurality of memory cells may be formed at points where word lines and bit lines cross each other, respectively. Each memory cell may include a volatile memory cell (e.g., a dynamic random access memory (DRAM) cell or a static RAM (SRAM) cell). However, the present disclosure is not limited thereto.

The I/O circuit 220 may receive the clock signal CLK from the memory controller 100. When the memory device 200 performs a write operation, the I/O circuit 220 may be configured to receive the data signal DQ. When the memory device 200 performs a read operation, the I/O circuit 220 may transmit the data signal DQ to the memory controller 100. Also, the I/O circuit 220 may generate 4-phase clock signals based on the clock signal CLK received from the memory controller 100. The memory device 200 may include a correction circuit for correcting errors in the 4-phase clock signals. The memory device 200 may correct errors in the 4-phase clock signals through the correction circuit such that the accuracy of data read accordingly may be improved. A description thereof will be provided below with reference to FIG. 5.

Figure 2:
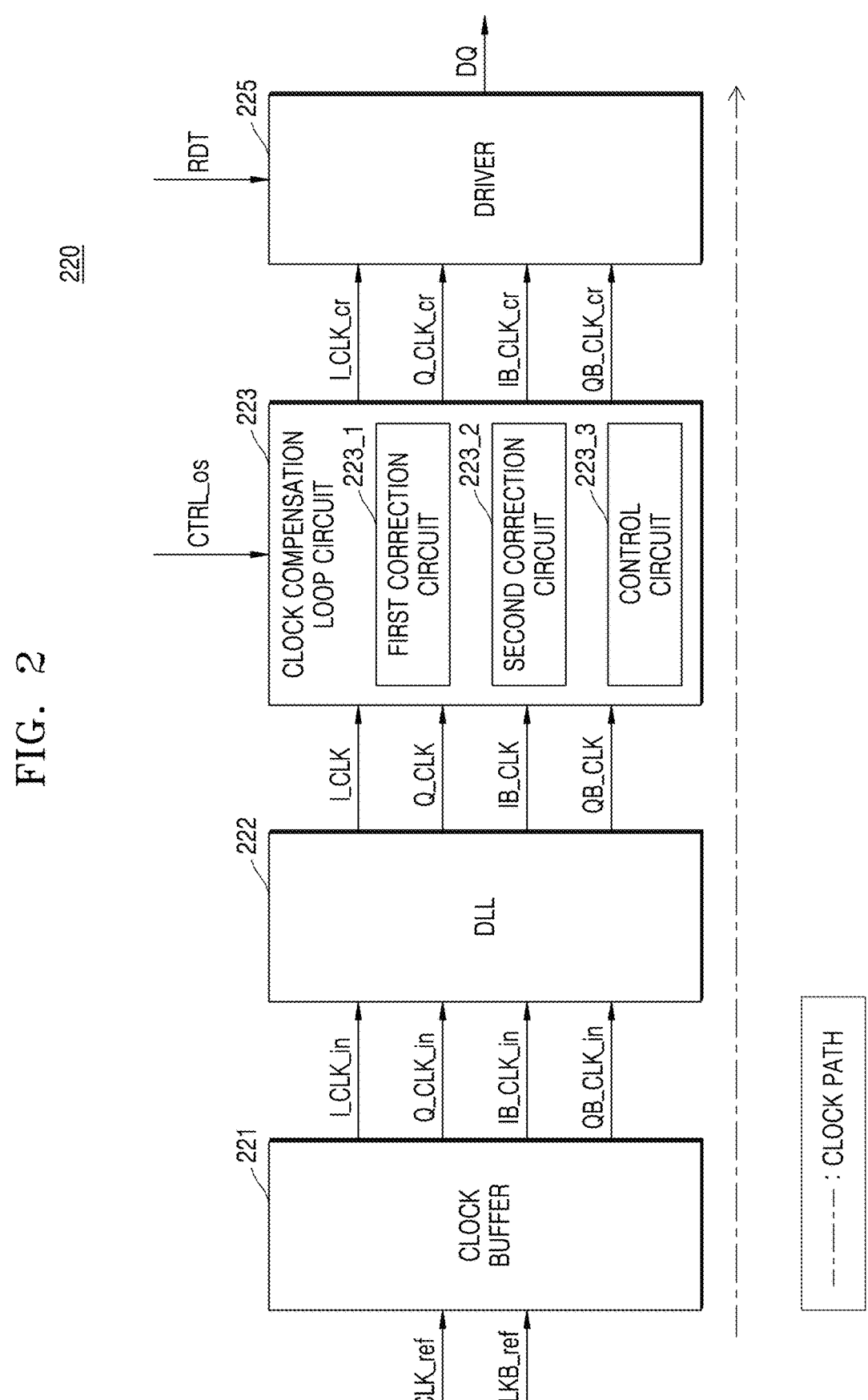
FIG. 2 is a block diagram of an example of an input/output circuit according to some implementations.

FIG. 2 is a block diagram of an example of an input/output circuit according to some implementations. FIG. 2 may be described with reference to FIG. 1, and redundant descriptions may be omitted.

In FIG. 2, an I/O circuit 220 may receive the clock signal CLK from the memory controller 100. The clock signal CLK may include a first reference clock signal CLK_ref and a second reference clock signal CLKB_ref. The first reference clock signal CLK_ref and the second reference clock signal CLKB_ref may have the same period, and a phase difference between the first reference clock signal CLK_ref and the second reference clock signal CLKB_ref may be 180 degrees. As shown in FIG. 2, an arrow shown as a dashed line from a clock buffer 221 to a driver 225 may refer to a clock path, that is, a path through which a clock signal received from the memory controller 100 is transmitted. As used herein, the clock path may also be referred to as a read path.

The I/O circuit 220 may include the clock buffer 221, a delay-locked loop (DLL) 222, a clock compensation loop circuit 223, and a driver 225. The clock buffer 221 may generate 4-phase clock signals based on the first reference clock signal CLK_ref and the second reference clock signal CLKB_ref, which are received from the memory controller 100. The 4-phase clock signals may be clock signals each having a lower frequency than those of the first reference clock signal CLK_ref and the second reference clock signal CLKB_ref. As used herein, the clock buffer 221 may also be referred to as a clock divider. The 4-phase clock signals may include, for example, a first input clock signal I_CLK_in, a second input clock signal Q_CLK_in, a third input clock signal IB_CLK_in, and a fourth input clock signal QB_CLK_in. In some implementations, the clock buffer 221 may output the first input clock signal I_CLK_in and the third input clock signal IB_CLK_in based on the first reference clock signal CLK_ref. A phase difference between the first input clock signal I_CLK_in and the third input clock signal IB_CLK_in may be 180 degrees. A frequency of each of the first input clock signal I_CLK_in and the third input clock signal IB_CLK_in may be lower (or less) than a frequency of the first reference clock signal CLK_ref. In other words, a period of each of the first input clock signal I_CLK_in and the third input clock signal IB_CLK_in may be longer than a period of the first reference clock signal CLK_ref. The clock buffer 221 may output the second input clock signal Q_CLK_in and the fourth input clock signal QB_CLK_in based on the second reference clock signal CLKB_ref. A phase difference between the second input clock signal Q_CLK_in and the fourth input clock signal QB_CLK_in may be 180 degrees. A frequency of each of the second input clock signal Q_CLK_in and the fourth input clock signal QB_CLK_in may be lower than a frequency of the second reference clock signal CLKB_ref. In other words, a period of each of the second input clock signal Q_CLK_in and the fourth input clock signal QB_CLK_in may be longer than a period of the second reference clock signal CLKB_ref.

The DLL 222 may receive, from the clock buffer 221, the first input clock signal I_CLK_in, the second input clock signal Q_CLK_in, the third input clock signal IB_CLK_in, and the fourth input clock signal QB_CLK_in. The DLL 222 may delay a phase of each received clock signal by a certain time period and may provide, to the clock compensation loop circuit 223, a first clock signal I_CLK, a second clock signal Q_CLK, a third clock signal IB_CLK, and a fourth clock signal QB_CLK, as delayed clock signals. In this case, the sizes of time periods delayed for respective clock signals may all be the same. This will be described below with reference to FIG. 4.

The clock compensation loop circuit 223 may include a first correction circuit 223_1, a second correction circuit 223_2, and a control circuit 223_3. The clock compensation loop circuit 223 may receive the offset control signal CTR-L_os from the memory controller 100. The second correction circuit 223_2 may generate an offset clock signal based on the offset control signal CTRL_os. As used herein, the offset control signal CTRL_os may also be referred to as a first control signal. The control circuit 223_3 may generate a correction control signal for adjusting phases of the first clock signal I_CLK, the second clock signal Q_CLK, the third clock signal IB_CLK, and the fourth clock signal QB_CLK, which are received by the first correction circuit 223_1, according to the offset clock signal received from the second correction circuit 223_2. The first correction circuit 223_1 may provide, to the driver 225, a first corrected clock signal I_CLK_cr, a second corrected clock signal Q_CLK_cr, a third corrected clock signal IB_CLK_cr, and a fourth corrected clock signal QB_CLK_cr, of which phases are adjusted, in response to the correction control signal received from the control circuit 223_3. A detailed description of the clock compensation loop circuit 223 will be provided below with reference to FIG. 3.

The driver 225 may receive read data RDT from the memory cell array 210. The read data RDT may be data stored in the memory cell array 210. The driver 225 may output the data signal DQ based on the first corrected clock signal I_CLK_cr, the second corrected clock signal Q_CLK_cr, the third corrected clock signal IB_CLK_cr, and the fourth corrected clock signal QB_CLK_cr, which are received from the clock compensation loop circuit 223. The data signal DQ may include the read data RDT.

Figure 3:
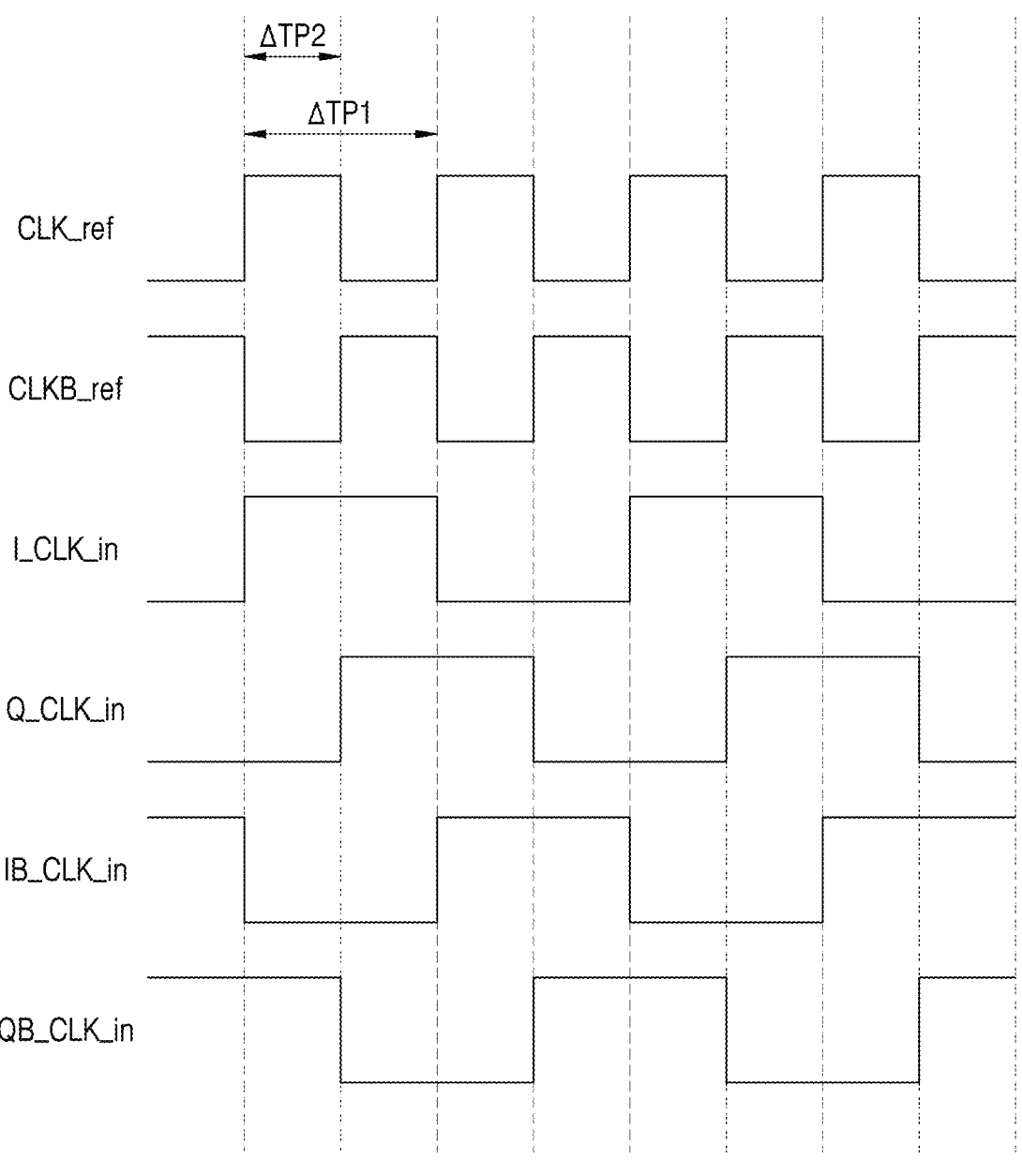
FIG. 3 is a timing diagram illustrating examples of a reference clock signal and an input clock signal according to some implementations.

FIG. 3 is a timing diagram illustrating examples of a reference clock signal and an input clock signal according to some implementations. FIG. 3 may be described with reference to FIGS. 1 and 2, and redundant descriptions may be omitted.

In FIG. 3, the first reference clock signal CLK_ref, the second reference clock signal CLKB_ref, the first input clock signal I_CLK_in, the second input clock signal Q_CLK_in, the third input clock signal IB_CLK_in, and the fourth input clock signal QB_CLK_in are shown.

The memory controller 100 may generate the first reference clock signal CLK_ref and the second reference clock signal CLKB_ref and provide the first reference clock signal CLK_ref and the second reference clock signal CLKB_ref to the memory device 200.

In some implementations, a period of each of the first reference clock signal CLK_ref and the second reference clock signal CLKB_ref may be a first period ΔTP1. As used herein, the first period ΔTP1 may be referred to as a reference period, and a period corresponding to half the reference period may be referred to as a second period ΔTP2.

In some implementations, a period of each of the first input clock signal I_CLK_in, the second input clock signal Q_CLK_in, the third input clock signal IB_CLK_in, and the fourth input clock signal QB_CLK_in may correspond to twice the first period ΔTP1.

In some implementations, each of the first input clock signal I_CLK_in, the second input clock signal Q_CLK_in, the third input clock signal IB_CLK_in, and the fourth input clock signal QB_CLK_in may be configured to have a phase difference corresponding to the second period ΔTP2. That is, a phase difference between the second input clock signal Q_CLK_in and the first input clock signal I_CLK_in may be 90 degrees. A phase difference between the third input clock signal IB_CLK_in and the first input clock signal I_CLK_in may be 180 degrees. A phase difference between the fourth input clock signal QB_CLK_in and the first input clock signal I_CLK_in may be 270 degrees.

Figure 4:
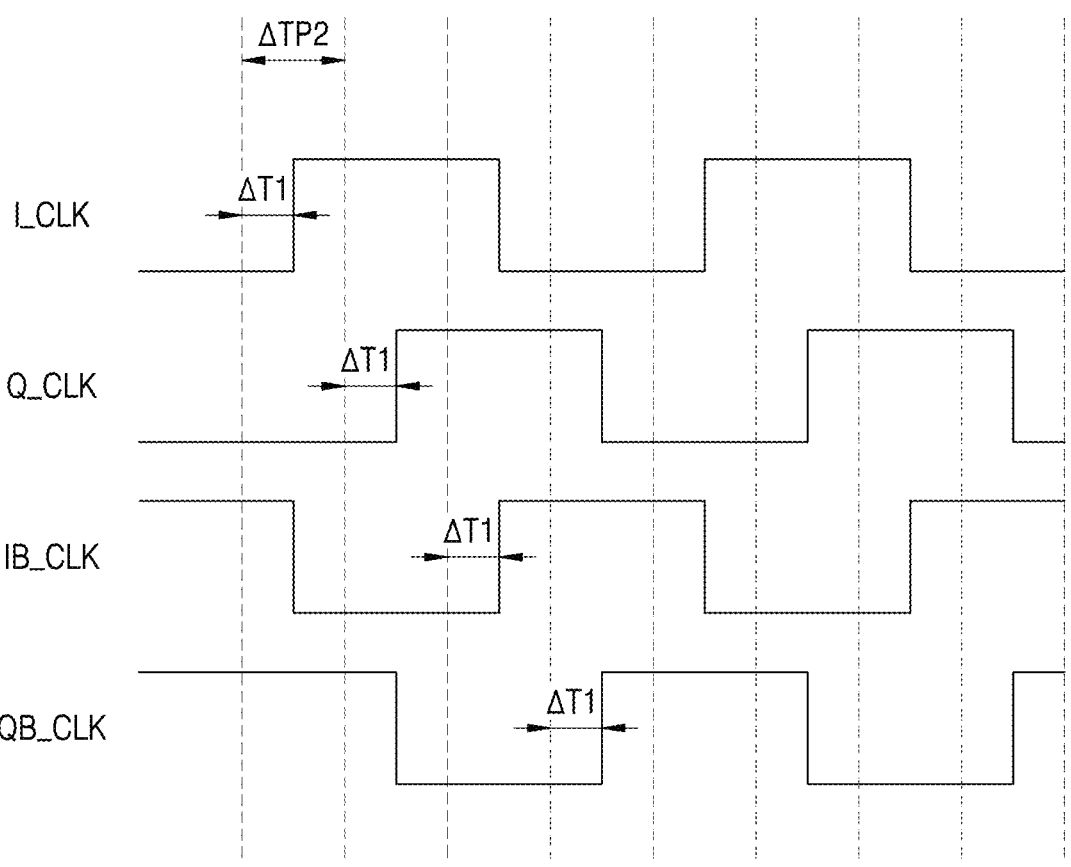
FIG. 4 is a timing diagram illustrating an example of a clock signal of a memory device according to some implementations.

FIG. 4 is a timing diagram illustrating an example of a clock signal of a memory device according to some implementations. FIG. 4 may be described with reference to FIGS. 1 to 3, including the memory device 200, and redundant descriptions may be omitted.

In FIG. 4, the first clock signal I_CLK, the second clock signal Q_CLK, the third clock signal IB_CLK, and the fourth clock signal QB_CLK are shown.

The DLL 222 may receive the first input clock signal I_CLK_in, the second input clock signal Q_CLK_in, the third input clock signal IB_CLK_in, and the fourth input clock signal QB_CLK_in and delay each input clock signal by the same phase. For example, the first clock signal I_CLK may be a signal obtained by delaying the first input clock signal I_CLK_in by a first time period ΔT1. The second clock signal Q_CLK may be a signal obtained by delaying the second input clock signal Q_CLK_in by the first time period ΔT1. The third clock signal IB_CLK may be a signal obtained by delaying the third input clock signal IB_CLK_in by the first time period ΔT1. The fourth clock signal QB_CLK may be a signal obtained by delaying the fourth input clock signal QB_CLK_in by the first time period ΔT1.

The DLL 222 may output the first clock signal I_CLK, the second clock signal Q_CLK, the third clock signal IB_CLK, and the fourth clock signal QB_CLK, which are generated by delaying the first input clock signal I_CLK_in, the second input clock signal Q_CLK_in, the third input clock signal IB_CLK_in, and the fourth input clock signal QB_CLK_in by the first time period ΔT1, respectively.

Figure 5:
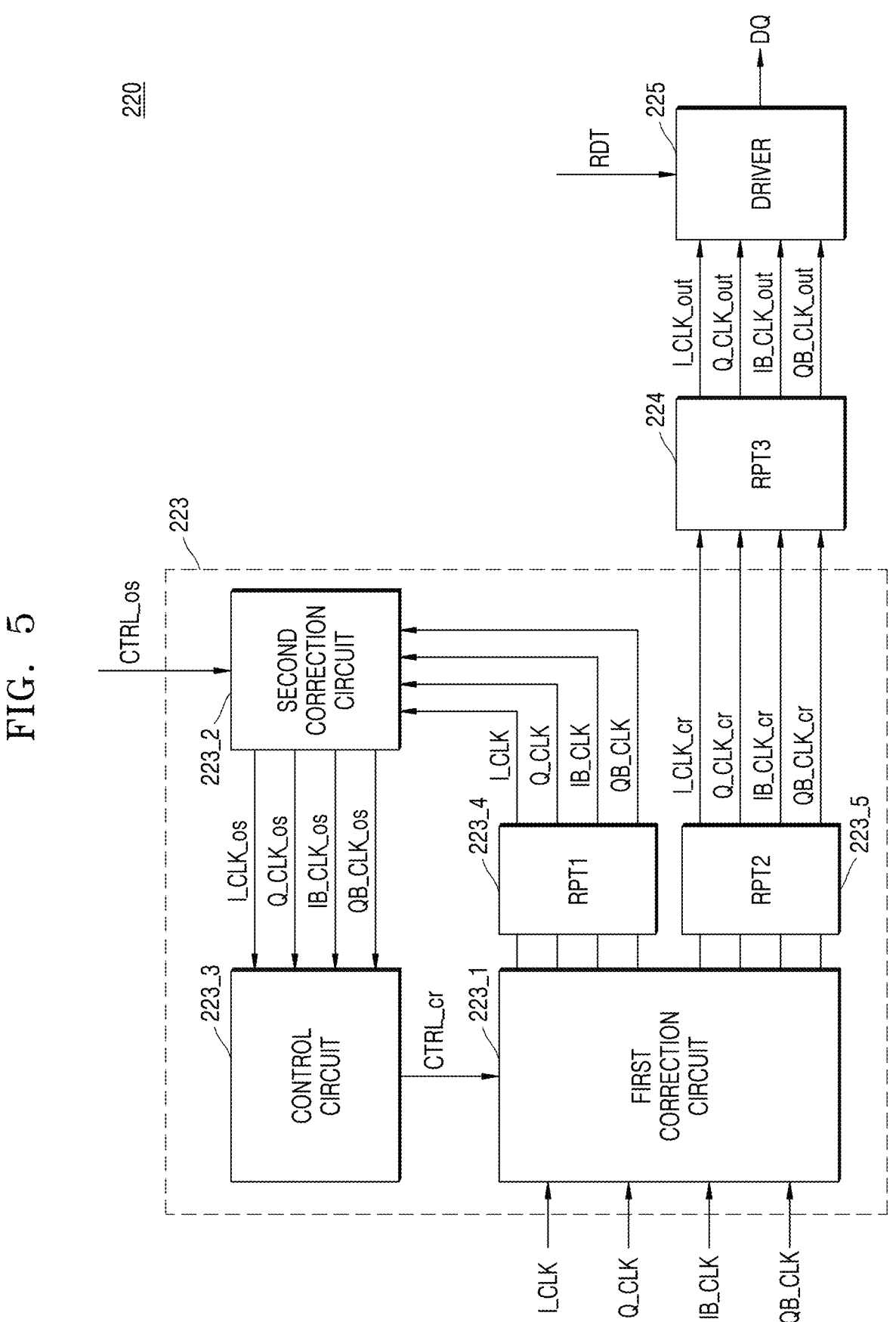
FIG. 5 is a block diagram of an example of an input/output circuit according to some implementations.

FIG. 5 is a block diagram of an example of an input/output circuit according to some implementations. FIG. 5 may be described with reference to FIGS. 1 and 2, and redundant descriptions may be omitted.

In FIG. 5, an I/O circuit 220 may include the clock compensation loop circuit 223, a third repeater (RPT3) 224, and the driver 225. In FIG. 5, for convenience of description, only the clock compensation loop circuit 223, the RPT3 224, and the driver 225 are shown as elements of the I/O circuit 220. The clock compensation loop circuit 223 may include the first correction circuit 223_1, the second correction circuit 223_2, the control circuit 223_3, a first repeater (RPT1) 223_4, and a second repeater (RPT2) 223_5. In an embodiment, the RPT1 223_4, the RPT2 223_5, and the RPT3 224 may each be a circuit configured to amplify a received signal and transmit the amplified signal to a single element.

The first correction circuit 223_1 may receive the first clock signal I_CLK, the second clock signal Q_CLK, the third clock signal IB_CLK, and the fourth clock signal QB_CLK. In the following descriptions, in addition to FIG. 5, for convenience of description, it is assumed that the phases of the first clock signal I_CLK, the second clock signal Q_CLK, the third clock signal IB_CLK, and the fourth clock signal QB_CLK have already been adjusted by the DLL 222 shown in FIG. 2.

The first correction circuit 223_1 may provide the first clock signal I_CLK, the second clock signal Q_CLK, the third clock signal IB_CLK, and the fourth clock signal QB_CLK to the second correction circuit 223_2 through the RPT1 223_4. The first correction circuit 223_1 may provide the first corrected clock signal I_CLK_cr, the second corrected clock signal Q_CLK_cr, the third corrected clock signal IB_CLK_cr, and the fourth corrected clock signal QB_CLK_cr to the RPT3 224 through the RPT2 223_5. As used herein, the first correction circuit 223_1 may also be referred to as a quadrature error correction circuit (QEC). In an embodiment, the RPT1 223_4 and the RPT2 223_5 may each include a plurality of inverters.

The first correction circuit 223_1 may perform correction of the first clock signal I_CLK, the second clock signal Q_CLK, the third clock signal IB_CLK, and the fourth clock signal QB_CLK based on a correction control signal CTRL_cr, which is generated by the control circuit 223_3. As used herein, the correction control signal CTRL_cr may also be referred to as a second control signal. The control circuit 223_3 may also be referred to as quadrature error detection circuit (QED).

In some implementations, the correction control signal CTRL_cr may include offset information about the first clock signal I_CLK, offset information about the second clock signal Q_CLK, offset information about the third clock signal IB_CLK, and offset information about the fourth clock signal QB_CLK.

The second correction circuit 223_2 may receive the offset control signal CTRL_os from the memory controller 100. The second correction circuit 223_2 may generate a first offset clock signal I_CLK_os, a second offset clock signal Q_CLK_os, a third offset clock signal IB_CLK_os, and a fourth offset clock signal QB_CLK_os, by delaying or advancing, by an offset, the phases of the first clock signal I_CLK, the second clock signal Q_CLK, the third clock signal IB_CLK, and the fourth clock signal QB_CLK, as indicated by the offset control signal CTRL_os. The second correction circuit 223_2 may provide the first offset clock signal I_CLK_os, the second offset clock signal Q_CLK_os, the third offset clock signal IB_CLK_os, and the fourth offset clock signal QB_CLK_os to the control circuit 223_3. In some implementations, the second correction circuit 223_2 may be referred to as a global duty cycle adjustment circuit (GDCA).

The control circuit 223_3 may determine the degree to which a clock signal received by the first correction circuit 223_1 is delayed, based on the first offset clock signal I_CLK_os, the second offset clock signal Q_CLK_os, the third offset clock signal IB_CLK_os, and the fourth offset clock signal QB_CLK_os. The control circuit 223_3 may adjust the phases of the first clock signal I_CLK, the second clock signal Q_CLK, the third clock signal IB_CLK, and the fourth clock signal QB_CLK. In this case, a direction in which the control circuit 223_3 adjusts a phase may be opposite to a direction in which the second correction circuit 223_2 adjusts a phase. For example, it may be assumed that the second correction circuit 223_2 generates the second offset clock signal Q_CLK_os by advancing the phase of the second clock signal Q_CLK by a second time period. In this case, the control circuit 223_3 may control the first correction circuit 223_1 such that the phase of the second clock signal Q_CLK, which is output to the RPT2 223_5, is delayed by the second time period through the correction control signal CTRL_cr. An example thereof will be described in detail with reference to FIGS. 7C and 7D.

The RPT3 224 may receive, from the RPT2 223_5, a first corrected clock signal I_CLK_cr, a second corrected clock signal Q_CLK_cr, a third corrected clock signal IB_CLK_cr, and a fourth corrected clock signal QB_CLK_cr and provide, to the driver 225, the first corrected clock signal I_CLK_cr, the second corrected clock signal Q_CLK_cr, the third corrected clock signal IB_CLK_cr, and the fourth corrected clock signal QB_CLK_cr. In some implementations, corrected clock signals provided to the driver 225 may be in the form of a first output clock signal I_CLK_out, a second output clock signal Q_CLK_out, a third output clock signal IB_CLK_out, and a fourth output clock signal QB_CLK_out. This may reflect that the first corrected clock signal I_CLK_cr, the second corrected clock signal Q_CLK_cr, the third corrected clock signal IB_CLK_cr, and the fourth corrected clock signal QB_CLK_cr are distorted while passing through a clock path. However, because the clock compensation loop circuit 223 performed correction of the clock signals considering this distortion, the driver 225 may output a data signal DQ including read data RDT stored in the memory cell array 210, by performing a read operation according to an accurate timing based on the clock signals each having a minimized error.

In some implementations, it may be assumed that the data signal DQ includes a first data signal and a second data signal, and the first data signal includes first reference data to fourth reference data. The memory controller 100 may adjust the phases of the first clock signal I_CLK, the second clock signal Q_CLK, the third clock signal IB_CLK, and the fourth clock signal QB_CLK, which are used to read the second data signal, by controlling the second correction circuit 223_2 through the offset control signal CTRL_os based on the degree to which the first to fourth reference data included in the first data signal is distorted. In this case, the degree to which the first to fourth reference data is distorted may be determined by comparing the size of each reference data with a reference unit interval (UI). As used herein, the reference UI may correspond to half the period of the first reference clock signal CLK_ref or the second reference clock signal CLKB_ref. For example, the reference UI may correspond to the second period ΔTP2 shown in FIGS. 3 and 4.

In some implementations, the memory controller 100 may not adjust the phase of the first clock signal I_CLK. In other words, the second correction circuit 223_2 may generate the first offset clock signal I_CLK_os having the same phase as the first clock signal I_CLK, according to the offset control signal CTRL_os received from the memory controller 100. This is, because the first clock signal I_CLK may be a reference point for other remaining clock signals.

In some implementations, the memory controller 100 may control the second correction circuit 223_2 to generate the second offset clock signal Q_CLK_os, the third offset clock signal IB_CLK_os, and the fourth offset clock signal QB_CLK_os, based on a result of the comparison of the size of each of the first to fourth reference data with the reference UI. A detailed description thereof will be provided with reference to FIGS. 7A to 7E.

Figure 6:
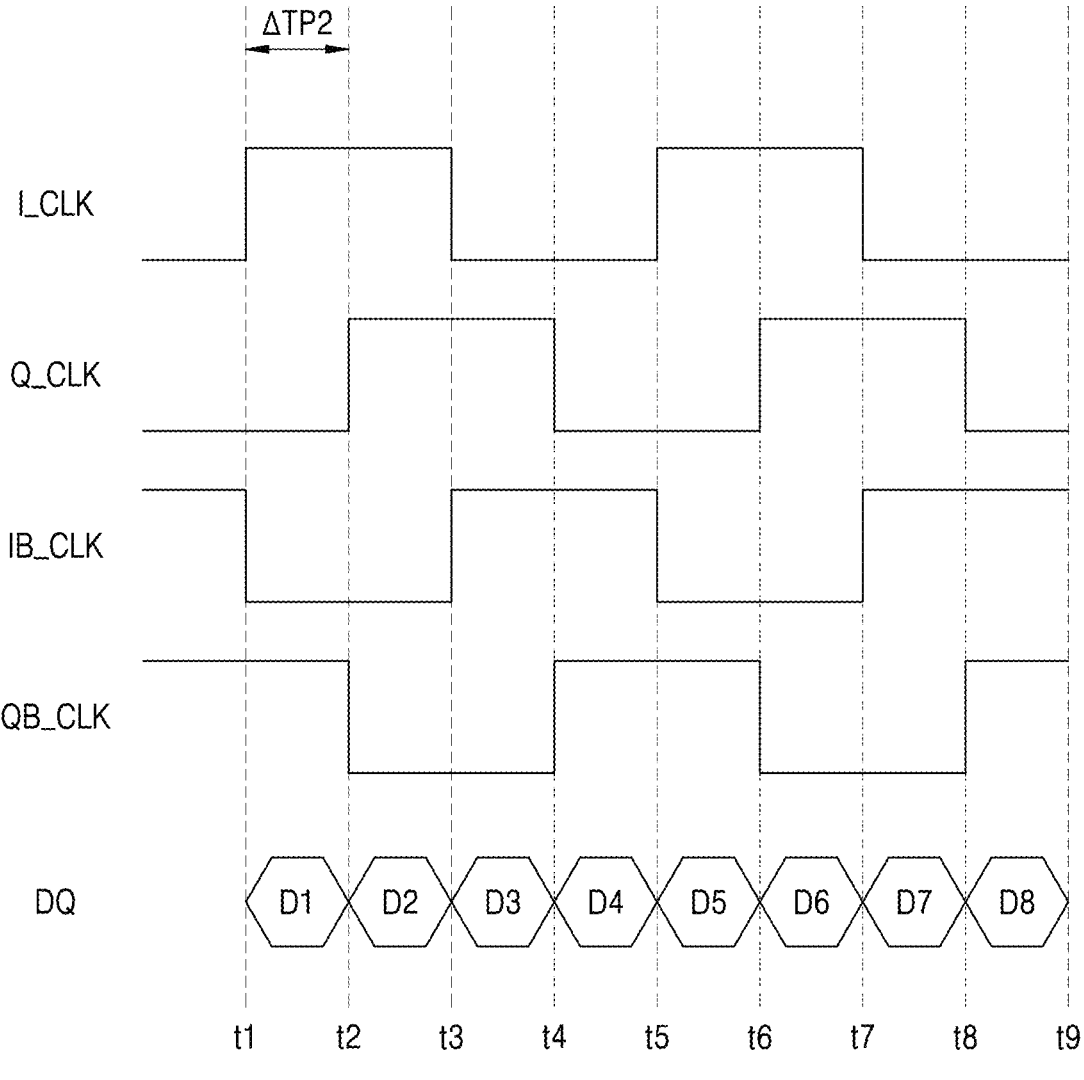
FIG. 6 is a timing diagram illustrating examples of data output according to a clock signal of a memory device according to some implementations.

FIG. 6 is a timing diagram illustrating examples of data output according to a clock signal of a memory device according to some implementations. FIG. 6 may be described with reference to FIGS. 1 to 5, including the memory device 200, and redundant descriptions may be omitted.

In FIG. 6, the memory device 200 outputs a data signal DQ including first to eighth data D1 to D8 based on the first clock signal I_CLK, the second clock signal Q_CLK, the third clock signal IB_CLK, and the fourth clock signal QB_CLK. The size of each of the first data D1 to the eighth data D8 may correspond to a second time period ΔTP2. That is, the size of each of the first data D1 to the eighth data D8 may correspond to a reference UI. In FIG. 6, a total of eight pieces of data, including the first data D1 to the eighth data D8, are shown as an example for explanation and are not intended to limit the present disclosure.

The driver 225 may output the first data D1 from a first time point t1 to a second time point t2. The first time point t1 may be a time point at which a rising edge of the first clock signal I_CLK occurs, and the second time point t2 may be a time point at which a rising edge of the second clock signal Q_CLK occurs.

The driver 225 may output second data D2 from the second time point t2 to a third time point t3. The second time point t2 may be the time point at which the rising edge of the second clock signal Q_CLK occurs, and the third time point t3 may be a time point at which a rising edge of the third clock signal IB_CLK occurs.

The driver 225 outputs third data D3 from the third time point t3 to a fourth time point t4. The third time point t3 may be the time point at which the rising edge of the third clock signal IB_CLK occurs, and the fourth time point t4 may be a time point at which a rising edge of the fourth clock signal QB_CLK occurs.

The driver 225 may output fourth data D4 from the fourth time point t4 to a fifth time point t5. The fourth time point t4 may be the time point at which the rising edge of the fourth clock signal QB_CLK occurs, and the fifth time point t5 may be a time point at which a rising edge of the first clock signal I_CLK occurs.

The driver 225 may output fifth data D5 from the fifth time point t5 to a sixth time point t6. The fifth time point t5 may be the time point at which the rising edge of the first clock signal I_CLK occurs, and the sixth time point t6 may be a time point at which a rising edge of the second clock signal Q_CLK occurs.

The driver 225 may output sixth data D6 from the sixth time point t6 to a seventh time point t7. The sixth time point t6 may be the time point at which the rising edge of the second clock signal Q_CLK occurs, and the seventh time point t7 may be a time point at which a rising edge of the third clock signal IB_CLK occurs.

The driver 225 may output seventh data D7 from the seventh time point t7 to an eighth time point t8. The seventh time point t7 may be the time point at which the rising edge of the third clock signal IB_CLK occurs, and the eighth time point t8 may be a time point at which a rising edge of the fourth clock signal QB_CLK occurs.

The driver 225 may output the eighth data D8 from the eighth time point t8 to a ninth time point t9. The eighth time point t8 may be the time point at which the rising edge of the fourth clock signal QB_CLK occurs, and the ninth time point t9 may be a time point at which a rising edge of the first clock signal I_CLK occurs.

As described above, timings at which the first to eighth data D1 to D8 are read from the first time point t1 to the ninth time point t9 have been described. FIG. 6 illustrates a process in which data is read in a situation where phases of clock signals are ideal, and when an error occurs in the phases of the clock signals until the clock signals are provided to the driver 225 along a clock path, a phase of a clock signal in which the error has occurred may need to be corrected. When the error has occurred as described above, the size of each of the first to eighth data D1 to D8 may not be constant. This will be described below with reference to FIGS. 7A to 7E.

FIGS. 7A to 7E are timing diagrams describing an example of a memory device correcting a clock signal according to some implementations. FIGS. 7A to 7E may be described with reference to FIGS. 1 to 6, including the memory device 200, and redundant descriptions may be omitted.

Figure 7A:
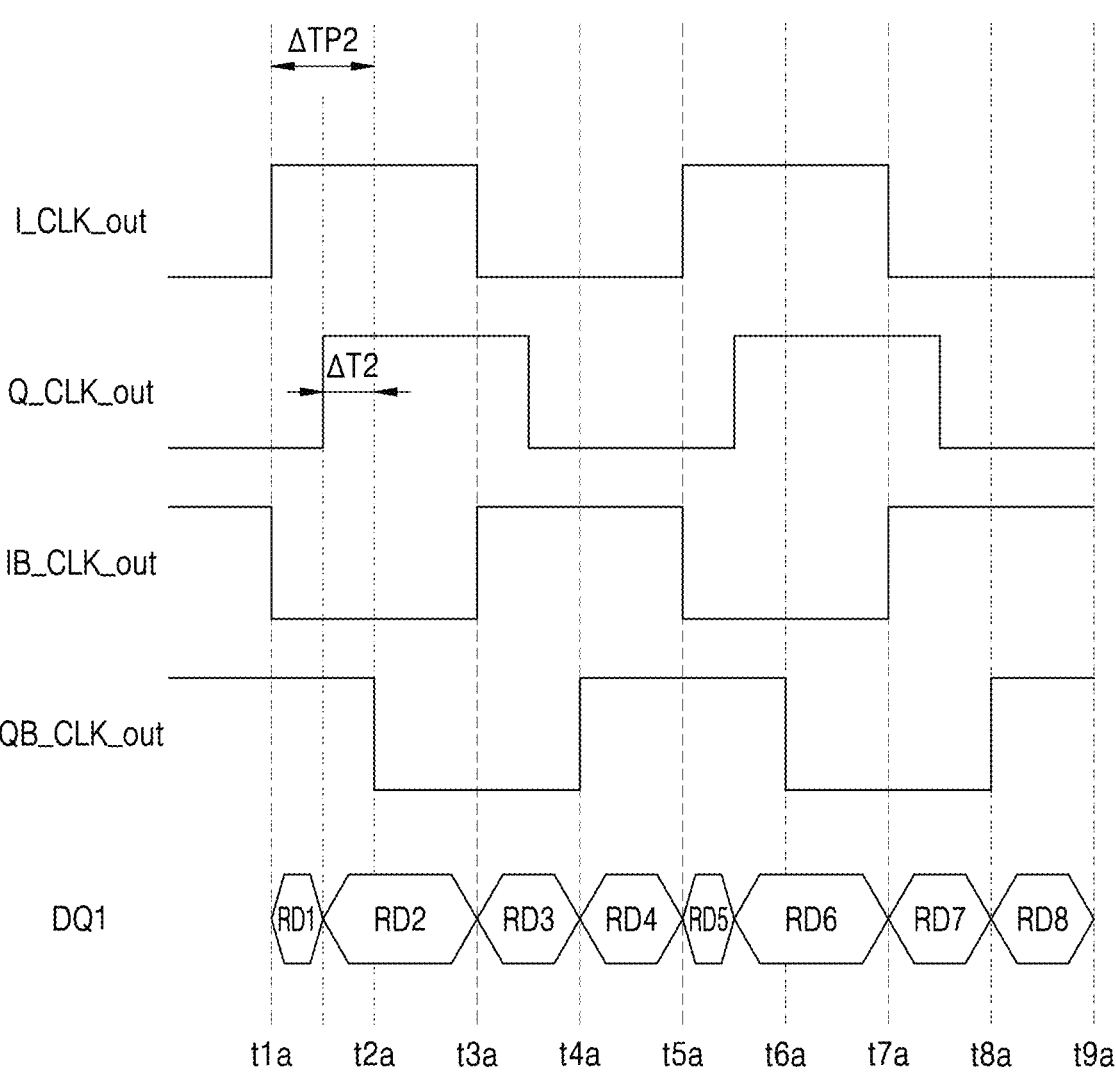
FIGS. 7A to 7E are timing diagrams describing an example of a memory device correcting a clock signal according to some implementations.

In FIG. 7A, the first output clock signal I_CLK_out, the second output clock signal Q_CLK_out, the third output clock signal IB_CLK_out, and the fourth output clock signal QB_CLK_out, which are received by the driver 225, are shown.

The driver 225 may receive, from the first correction circuit 223_1, the first corrected clock signal I_CLK_cr, the second corrected clock signal Q_CLK_cr, the third corrected clock signal IB_CLK_cr, and the fourth corrected clock signal QB_CLK_cr and perform a read operation based on these signals. When there is no error in a process of transmitting a clock signal to the driver 225, forms of the first corrected clock signal I_CLK_cr, the second corrected clock signal Q_CLK_cr, the third corrected clock signal IB_CLK_cr, and the fourth corrected clock signal QB_CLK_cr from the first correction circuit 223_1, which are received by the driver 225, may be the same as ideal forms of the clock signals shown in FIG. 6. However, when an error occurs in a process of providing clock signals to the driver 225 along a clock path, the clock signals received by the driver 225 may include the first output clock signal I_CLK_out, the second output clock signal Q_CLK_out, the third output clock signal IB_CLK_out, and the fourth output clock signal QB_CLK_out, which are different from the first corrected clock signal I_CLK_cr, the second corrected clock signal Q_CLK_cr, the third corrected clock signal IB_CLK_cr, and the fourth corrected clock signal QB_CLK_cr. In FIG. 7A, for convenience of description, it is assumed that an error occurs in relation to the second output clock signal Q_CLK_out. That is, it is assumed that a time point at which a logic level of the second output clock signal Q_CLK_out transitions to a high level occurs not at a second time point t2a, but at a time point that is advanced from the second time point t2a by a second time period ΔT2. This is only an example for explanation and is not intended to limit the present disclosure.

In some implementations, the driver 225 may operate based on the first output clock signal I_CLK_out, the second output clock signal Q_CLK_out, the third output clock signal IB_CLK_out, and the fourth output clock signal QB_CLK_out. The driver 225 may output a first data signal DQ1 from the memory cell array 210 to the memory controller 100, the first data signal DQ1 including first reference data RD1 to eighth reference data RD8. In this case, because a phase of the second output clock signal Q_CLK_out is advanced by the second time period ΔT2, the size of the first reference data RD1 may be smaller than the reference UI and the size of second reference data RD2 may be larger than the reference UI. Similarly, the size of fifth reference data RD5 may be smaller than the reference UI and the size of sixth reference data RD6 may be larger than the reference UI. The memory controller 100 may receive the first data signal DQ1 from the memory device 200. Because the sizes of the first reference data RD1, the second reference data RD2, the fifth reference data RD5, and the sixth reference data RD6, from among pieces of data included in the first data signal DQ1, do not match the reference UI, the memory controller 100 may determine that the second clock signal Q_CLK requires correction.

Figure 7B:
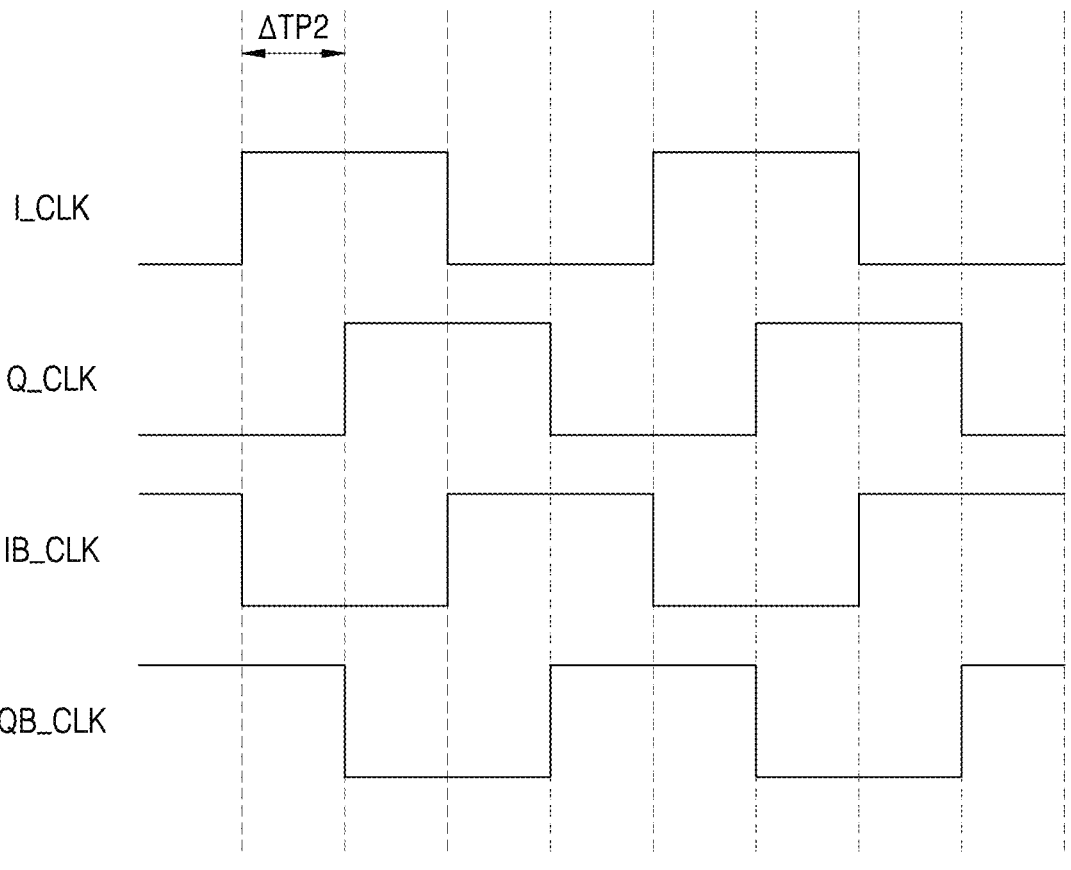

In FIG. 7B, the first clock signal I_CLK, the second clock signal Q_CLK, the third clock signal IB_CLK, and the fourth clock signal QB_CLK, which are provided to the second correction circuit 223_2, are shown.

Figure 7C:
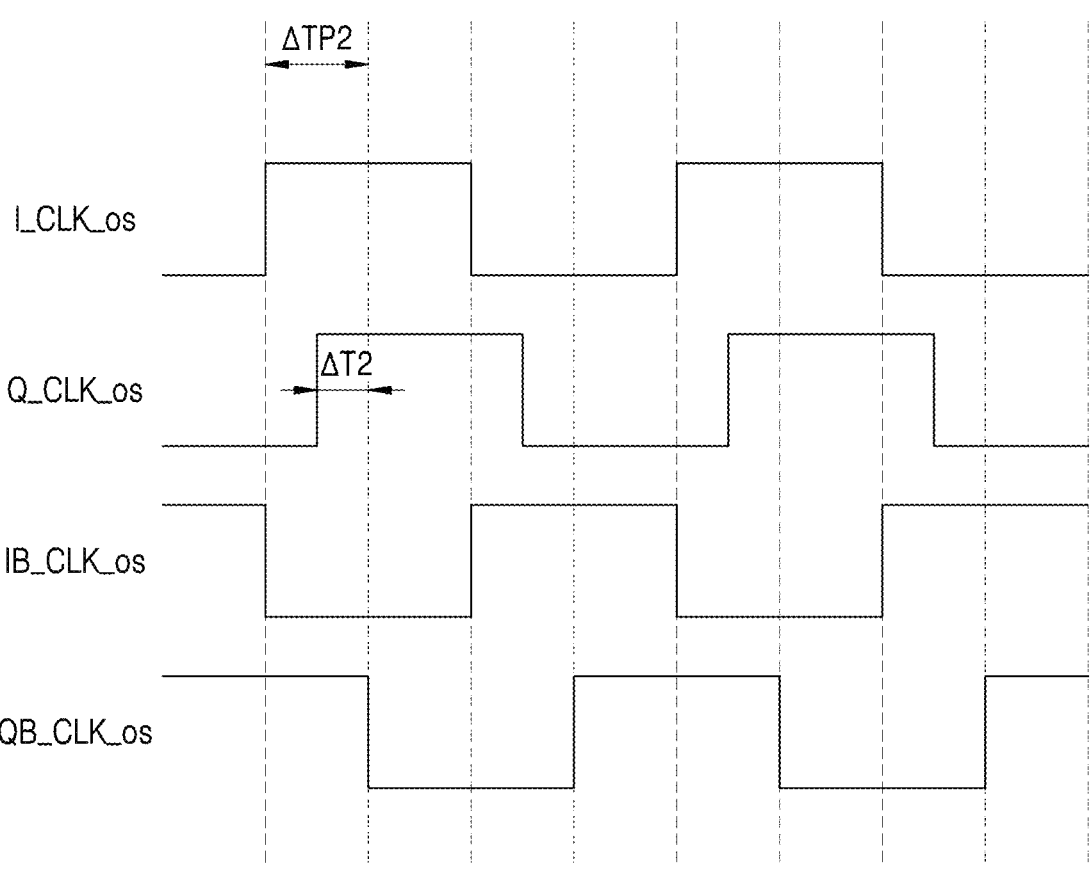

In FIG. 7C, the first offset clock signal I_CLK_os, the second offset clock signal Q_CLK_os, the third offset clock signal IB_CLK_os, and the fourth offset clock signal QB_CLK_os, which are output from the second correction circuit 223_2, are shown. By adjusting the phases of the first clock signal I_CLK, the second clock signal Q_CLK, the third clock signal IB_CLK, and the fourth clock signal QB_CLK, which are shown in FIG. 7B, the second correction circuit 223_2 may generate the first offset clock signal I_CLK_os, the second offset clock signal Q_CLK_os, the third offset clock signal IB_CLK_os, and the fourth offset clock signal QB_CLK_os. The second correction circuit 223_2 may output offset clock signals in response to the offset control signal CTRL_os received from the memory controller 100.

In some implementations, because the memory controller 100 has determined that the second clock signal Q_CLK requires correction based on the first data signal DQ1, the memory controller 100 may provide, to the second correction circuit 223_2, the offset control signal CTRL_os that adjusts an offset of the second clock signal Q_CLK. Contrary to the assumption in FIG. 7A, when the memory controller 100 has determined that the third clock signal IB_CLK requires correction based on the first data signal DQ1, the memory controller 100 may provide, to the second correction circuit 223_2, the offset control signal CTRL_os that adjusts an offset of the third clock signal IB_CLK. Similarly, when the memory controller 100 has determined that the fourth clock signal QB_CLK requires correction based on the first data signal DQ1, the memory controller 100 may provide, to the second correction circuit 223_2, the offset control signal CTRL_os that adjusts an offset of the fourth clock signal QB_CLK.

In some implementations, as shown in FIG. 7A, when the size of the first reference data is smaller than reference UI, the memory controller 100 may control the second correction circuit 223_2 to generate the second offset clock signal Q_CLK_os by advancing the phase of the second clock signal Q_CLK by an offset. In this case, the size of the offset may correspond to a difference between the length of the reference UI and the length of a UI of the first reference data. For example, the size of the offset may correspond to the second time period ΔT2.

In some implementations, when a case opposite to the case as shown in FIG. 7A is assumed, that is, when the size of the first reference data is larger than the reference UI, the memory controller 100 may control the second correction circuit 223_2 to generate the second offset clock signal Q_CLK_os by delaying the phase of the second clock signal Q_CLK by an offset. In this case, the size of the offset may correspond to the difference between the length of the UI of the first reference data and the length of the reference UI. For example, the size of the offset may correspond to the second time period ΔT2.

Figure 7D:
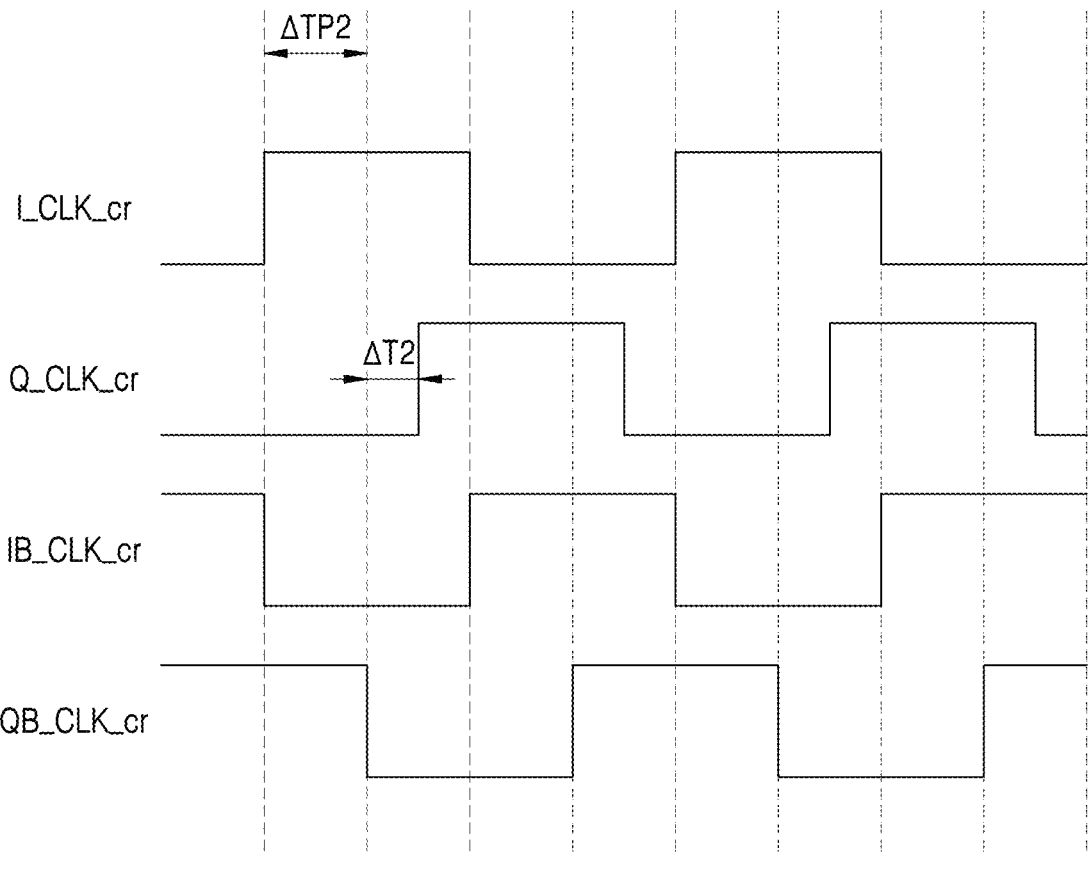

In FIG. 7D, the first corrected clock signal I_CLK_cr, the second corrected clock signal Q_CLK_cr, the third corrected clock signal IB_CLK_cr, and the fourth corrected clock signal QB_CLK_cr are shown.

The control circuit 223_3 may receive, from the second correction circuit 223_2, the second offset clock signal Q_CLK_os of which the phase is advanced by the second time period ΔT2. In this case, the control circuit 223_3 may generate the correction control signal CTRL_cr, which delays the phase of the second clock signal Q_CLK by the second time period ΔT2, in order to correct the second clock signal Q_CLK. The control circuit 223_3 may provide the correction control signal CTRL_cr to the first correction circuit 223_1.

In response to the correction control signal CTRL_cr from the control circuit 223_3, the first correction circuit 223_1 may output the first corrected clock signal I_CLK_cr, the second corrected clock signal Q_CLK_cr, the third corrected clock signal IB_CLK_cr, and the fourth corrected clock signal QB_CLK_cr. The first corrected clock signal I_CLK_cr, the second corrected clock signal Q_CLK_cr, the third corrected clock signal IB_CLK_cr, and the fourth corrected clock signal QB_CLK_cr may be provided to the driver 225 through the RPT2 223_5 and the RPT3 224.

Figure 7E:
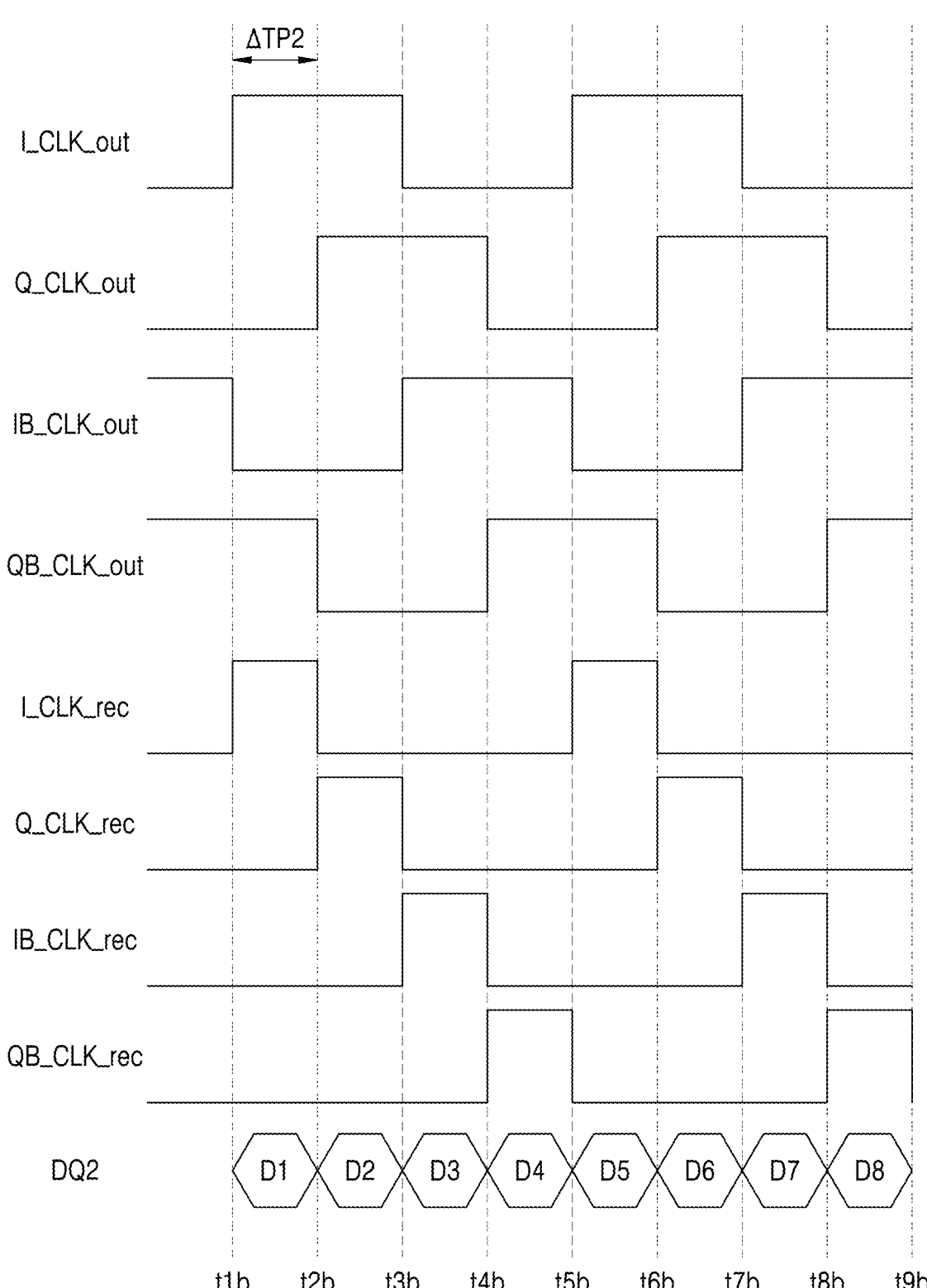

In FIG. 7E, shown are the first output clock signal I_CLK_out, the second output clock signal Q_CLK_out, the third output clock signal IB_CLK_out, and the fourth output clock signal QB_CLK_out, in which correction values are reflected based on the first corrected clock signal I_CLK_cr, the second corrected clock signal Q_CLK_cr, the third corrected clock signal IB_CLK_cr, and the fourth corrected clock signal QB_CLK_cr.

In some implementations, based on the first output clock signal I_CLK_out, the second output clock signal Q_CLK_out, the third output clock signal IB_CLK_out, and the fourth output clock signal QB_CLK_out, which are shown in FIG. 7E, the driver 225 may convert the clock signals into a first recovered clock signal I_CLK_rec, a second recovered clock signal Q_CLK_rec, a third recovered clock signal IB_CLK_rec, and a fourth recovered clock signal QB_CLK_rec. A pulse width of each of the first recovered clock signal I_CLK_rec, the second recovered clock signal Q_CLK_rec, the third recovered clock signal IB_CLK_rec, and the fourth recovered clock signal QB_CLK_rec may correspond to the second period ΔTP2.

In some implementations, the driver 225 may output a second data signal DQ2 by reading data from the memory cell array 210 based on the first recovered clock signal I_CLK_rec, the second recovered clock signal Q_CLK_rec, the third recovered clock signal IB_CLK_rec, and the fourth recovered clock signal QB_CLK_rec. The second data signal DQ2 may include first data D1 to eighth data D8. In this case, the size of the first data D1 to the eighth data D8 included in the second data signal DQ2 may be constant.

Figure 8:
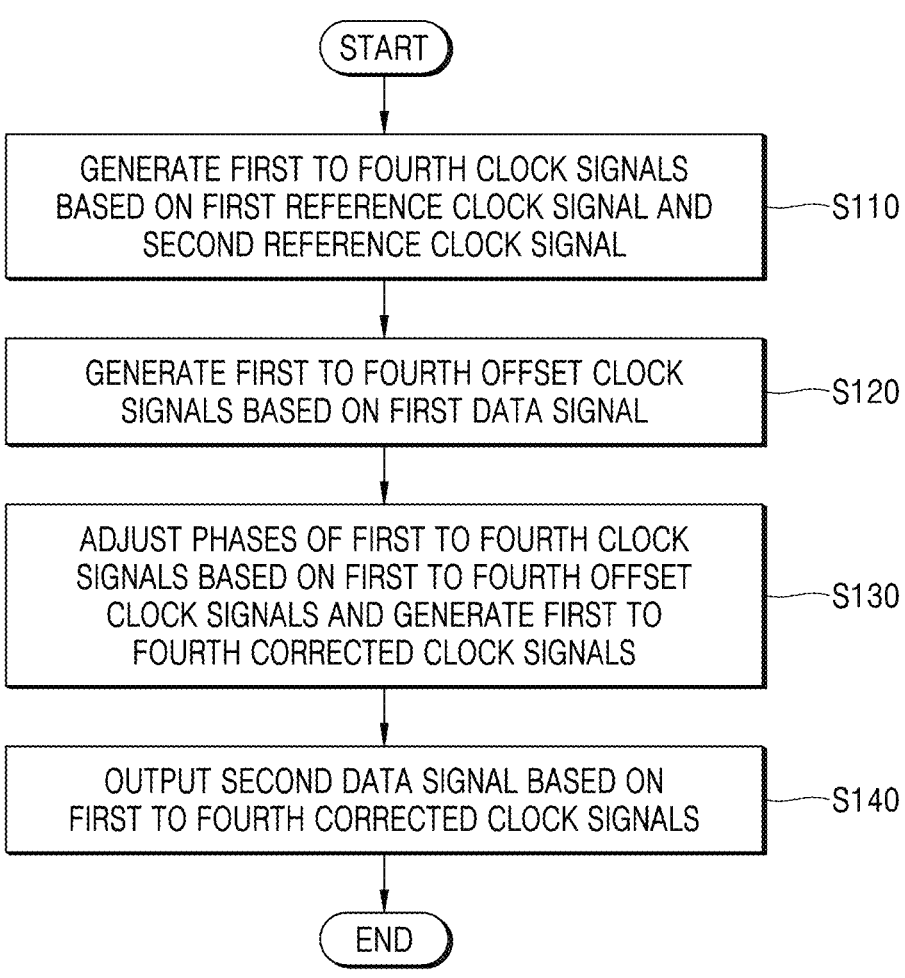
FIG. 8 is a flowchart to describe an example of an operating method of a memory device according to some implementations.

FIG. 8 is a flowchart to describe an example of an operating method of a memory device according to some implementations. FIG. 8 may be described with reference to FIGS. 1 to 7E, including the memory device 200, and redundant descriptions may be omitted.

In FIG. 8, in operation S110, the memory device 200 may generate a first clock signal I_CLK, a second clock signal Q_CLK, a third clock signal IB_CLK, and a fourth clock signal QB_CLK, based on a first reference clock signal CLK_ref and a second reference clock signal CLKB_ref, which are received from the memory controller 100.

In some implementations, a period of each of the first clock signal I_CLK, the second clock signal Q_CLK, the third clock signal IB_CLK, and the fourth clock signal QB_CLK may correspond to twice a period of each of the first reference clock signal CLK_ref and the second reference clock signal CLKB_ref.

In some implementations, a phase difference between the second clock signal Q_CLK and the first clock signal I_CLK may be 90 degrees. A phase difference between the third clock signal IB_CLK and the first clock signal I_CLK may be 180 degrees. A phase difference between the fourth clock signal QB_CLK and the first clock signal I_CLK may be 270 degrees.

In operation S120, the memory device 200 may generate a first offset clock signal I_CLK_os, a second offset clock signal Q_CLK_os, a third offset clock signal IB_CLK_os, and a fourth offset clock signal QB_CLK_os based on the size of each of first to fourth reference data RD1 to RD4 included in a first data signal DQ1. In detail, the memory controller 100 may receive the first data signal DQ1 from the memory device 200 and provide, to the memory device 200, an offset control signal CTRL_os generated based on the size of the first to fourth reference data RD1 to RD4 included in the first data signal DQ1. In response to the offset control signal CTRL_os, the memory device 200 may adjust phases of the first clock signal I_CLK, the second clock signal Q_CLK, the third clock signal IB_CLK, and the fourth clock signal QB_CLK through the second correction circuit 223_2.

In some implementations, when the size of the first reference data RD1 is smaller than a reference UI, the memory device 200 may generate the second offset clock signal Q_CLK_os by advancing the phase of the second clock signal Q_CLK by an offset. In this case, the size of the offset may correspond to a difference between the reference UI and the size of the first reference data RD1.

In some implementations, when the size of the first reference data RD1 is larger than the reference UI, the memory device 200 may generate the second offset clock signal Q_CLK_os by delaying the phase of the second clock signal Q_CLK by an offset. In this case, the size of the offset may correspond to the difference between the size of the first reference data RD1 and the reference UI.

In operation S130, the memory device 200 may adjust the phases of the first clock signal I_CLK, the second clock signal Q_CLK, the third clock signal IB_CLK, and the fourth clock signal QB_CLK, based on the first offset clock signal I_CLK_os, the second offset clock signal Q_CLK_os, the third offset clock signal IB_CLK_os, and the fourth offset clock signal QB_CLK_os. The memory device 200 may generate a first corrected clock signal I_CLK_cr, a second corrected clock signal Q_CLK_cr, a third corrected clock signal IB_CLK_cr, and a fourth corrected clock signal QB_CLK_cr, which are clock signals of which phases are adjusted.

In operation S140, the memory device 200 may output a second data signal DQ2 including first data D1 to fourth data D4, based on the first corrected clock signal I_CLK_cr, the second corrected clock signal Q_CLK_cr, the third corrected clock signal IB_CLK_cr, and the fourth corrected clock signal QB_CLK_cr.

Figure 9:
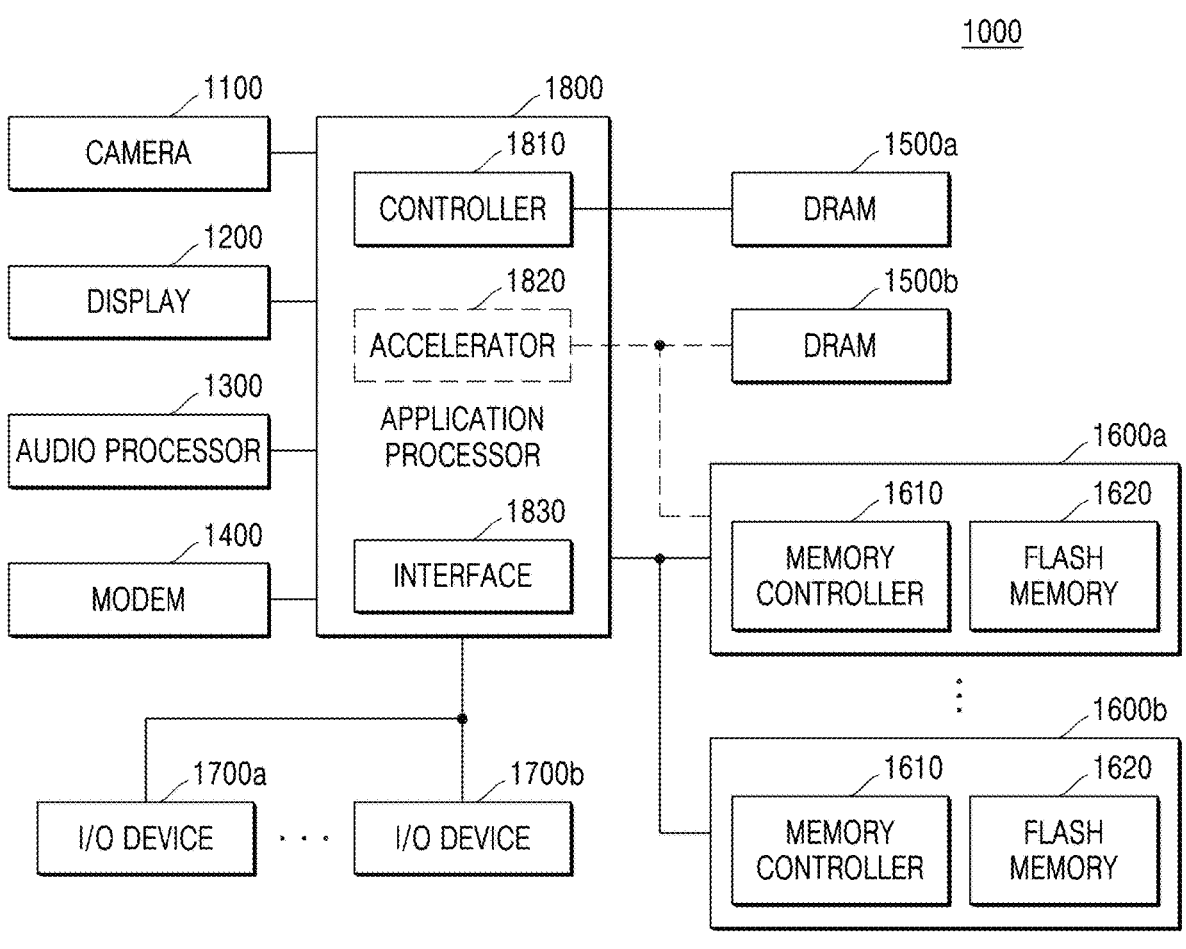
FIG. 9 is a block diagram of an example of a system of an electronic device including a memory device according to some implementations.

FIG. 9 is a block diagram of an example of a system of an electronic device including a memory device according to some implementations. In FIG. 9, a system 1000 may include a camera 1100, a display 1200, an audio processor 1300, a modem 1400, DRAMs 1500a and 1500b, flash memories 1600a and 1600b, I/O devices 1700a and 1700b, and an application processor (AP) 1800. The system 1000 may be implemented as a laptop computer, a mobile phone, a smartphone, a tablet PC, a wearable device, a healthcare device, or an Internet of Things (IoT) device. Also, the system 1000 may be implemented as a server or a PC.

The camera 1100 may capture still images or record videos under user control and may store obtained image/video data or transmit the image/video data to the display 1200. The audio processor 1300 may process audio data included in the flash memories 1600a and 1600b or network content. The modem 1400 may modulate and transmit a signal for wired/wireless data transmission and reception, and at the receiving end, the signal may be demodulated and restored to an original signal. The I/O devices 1700a and 1700b may include devices that provide a digital input and/or output function, such as a universal serial bus (USB) or storage, a digital camera, a secure digital (SD) card, a digital versatile disc (DVD), a network adapter, and a touch screen.

The AP 1800 may control all operations of the system 1000. The AP 1800 may include a controller 1810, an accelerator 1820, and an interface 1830. The AP 1800 may control the display 1200 such that part of content stored in the flash memories 1600a and 1600b is displayed on the display 1200. When a user input is received through the I/O devices 1700a and 1700b, the AP 1800 may perform a control operation corresponding to the user input. The AP 1800 may include an accelerator block, which is a dedicated circuit for artificial intelligence (AI) data operations, or may include the accelerator 1820 separate from the AP 1800. The DRAM 1500b may be additionally mounted on the accelerator 1820. An accelerator is a functional block that specializes in performing a specific function of the AP 1800, and the accelerator may include a graphics processing unit (GPU), which is a functional block specializing in graphics data processing, a neural processing unit (NPU), which is a block specializing in AI calculations and inference, and a data processing unit (DPU), which is a block specializing in data transmission.

The system 1000 may include the plurality of DRAMs 1500a and 1500b. The AP 1800 may perform communication by setting a DRAM interface protocol to control the DRAMs 1500a and 1500b through command and mode register (MRS) settings that meet the Joint Electron Device Engineering Council (JEDEC) standard or to perform company-specific functions, such as low voltage, high speed, and reliability, and cyclic redundancy check (CRC)/error correction code (ECC) functions. For example, the AP 1800 may communicate with the DRAM 1500a through an interface that complies with the JEDEC standard, such as LPDDR4 or LPDDR5, and the accelerator 1820 may perform communication by setting a new DRAM interface protocol to control the DRAM 1500b for accelerators, which has a higher bandwidth than that of the DRAM 1500a.

Although FIG. 9 may show only the DRAMs 1500a and 1500b, the present disclosure is not limited thereto. Any memory, such as phase-change RAM (PRAM), static RAM (SRAM), magneto-resistive RAM (MRAM), resistive RAM (RRAM), ferroelectric RAM (FRAM), or hybrid RAM, may be used as long as bandwidth, response speed, and voltage conditions of the AP 1800 or the accelerator 1820 are satisfied. The DRAMs 1500a and 1500b have relatively smaller latency and bandwidth than those of the I/O devices 1700a and 1700b or the flash memories 1600a and 1600b. The DRAMs 1500a and 1500b may be initialized when the system 1000 is powered on, and when an operating system and application data are loaded, the DRAMs 1500a and 1500b may be used as a temporary storage location for the operating system and application data or as an execution space for various software code.

Four fundamental arithmetic operations, including addition, subtraction, multiplication, and division, a vector operation, an address operation, or a fast Fourier transform (FFT) operation may be performed in the DRAMs 1500a and 1500b. Also, a function for execution used for inference may be performed in the DRAMs 1500a and 1500b. In this case, inference may be performed in a deep learning algorithm using an artificial neural network. The deep learning algorithm may include a training operation of learning a model through various types of data and an inference operation of identifying data with the trained model. In an embodiment, an image captured by a user using the camera 1100 may be signal-processed and stored in the DRAM 1500*b*, and the accelerator 1820 may perform an AI data operation to identify data by using data stored in the DRAM 1500*b* and the function used for inference.

The system 1000 may include the plurality of flash memories 1600*a* and 1600*b* or a plurality of storages having larger capacities than those of the DRAMs 1500*a* and 1500*b*. The accelerator 1820 may perform the training operation and the AI data operation by using the flash memories 1600*a* and 1600*b*. In some implementations, the flash memories 1600*a* and 1600*b* may each include a memory controller 1610 and a flash memory 1620 and may more efficiently perform the training operation and inference AI data operation, which are performed by the AP 1800 and/or the accelerator 1820, by using a calculation device provided in the memory controller 1610. The flash memories 1600*a* and 1600*b* may store photos captured by the camera 1100 or store data transmitted over a data network. For example, augmented reality/virtual reality, high definition (HD), or ultra HD (UHD) content may be stored.

While this disclosure contains many specific implementation details, these should not be construed as limitations on the scope of what may be claimed. Certain features that are described in this disclosure in the context of separate implementations can also be implemented in combination in a single implementation. Conversely, various features that are described in the context of a single implementation can also be implemented in multiple implementations separately or in any suitable subcombination. Moreover, although features may be described above as acting in certain combinations, one or more features from a combination can in some cases be excised from the combination, and the combination may be directed to a subcombination or variation of a subcombination.

What is claimed is:

1. A memory device comprising:
a memory cell array storing a plurality of data;
a first correction circuit configured to receive a plurality of clock signals and a control signal, adjust phases of the plurality of clock signals based on the control signal, and output a plurality of corrected clock signals;
a second correction circuit configured to receive the plurality of clock signals through the first correction circuit, adjust the phases of the plurality of clock signals based on a size of each of a plurality of reference data included in a first data signal, and output a plurality of offset clock signals;
a control circuit configured to generate the control signal based on the plurality of offset clock signals received from the second correction circuit; and
a driver configured to output, based on the plurality of corrected clock signals received from the first correction circuit, a second data signal including the plurality of data read from the memory cell array,
wherein the phases of the plurality of clock signals are adjusted, by the second correction circuit, based on a comparison of a size of a first reference data of the plurality of reference data with a reference unit interval.

2. The memory device of claim 1, further comprising:
a clock buffer circuit configured to receive a first reference clock signal and a second reference clock signal, generate, based on the first reference clock signal, a first clock signal of the plurality of clock signal and a third clock signal of the plurality of clock signals, each having a longer period than a period of the first reference clock signal, and generate, based on the second reference clock signal, a second clock signal of the plurality of clock signal and a fourth clock signal of the plurality of clock signals, each having a longer period than a period of the second reference clock signal; and
a delay-locked loop circuit configured to delay each of the phases of the first, second, third, and fourth clock signals by an equal time period and provide the delayed first, second, third, and fourth clock signals to the first correction circuit.

3. The memory device of claim 1,
wherein, from among the plurality of corrected clock signals, a phase difference between a second corrected clock signal of the plurality of corrected clock signal and a first corrected clock signal of the plurality of corrected clock signals corresponds to 90 degrees,
wherein, from among the plurality of corrected clock signals, a phase difference between a third corrected clock signal of the plurality of corrected clock signals and the first corrected clock signal corresponds to 180 degrees, and
wherein, from among the plurality of corrected clock signals, a phase difference between a fourth corrected clock signal of the plurality of corrected clock signals and the first corrected clock signal corresponds to 270 degrees.

4. The memory device of claim 1, wherein the driver is further configured to:
read a first data of the plurality of data from a rising edge of a first corrected clock signal of the plurality of corrected clock signals to a rising edge of a second corrected clock signal of the plurality of corrected clock signals,
read a second data of the plurality of data from the rising edge of the second corrected clock signal to a rising edge of a third corrected clock signal of the plurality of corrected clock signals,
read a third data of the plurality of data from the rising edge of the third corrected clock signal to a rising edge of a fourth corrected clock signal of the plurality of corrected clock signals, and
read a fourth data of the plurality of data from the rising edge of the fourth corrected clock signal to the rising edge of the first corrected clock signal.

5. The memory device of claim 1, wherein the second correction circuit is further configured to generate a first offset clock signal of the plurality of offset clock signals having a same phase as a first clock signal of the plurality of clock signals.

6. The memory device of claim 1,
wherein the second correction circuit is further configured to, based on the size of the first reference data of the plurality of reference data being smaller than the reference unit interval, generate a second offset clock signal from among the plurality of offset clock signals, by advancing the phase of a second clock signal of the plurality of clock signals by an offset, and provide the generated second offset clock signal to the control circuit,
wherein a size of the offset corresponds to a difference between the reference unit interval and the size of the first reference data.

7. The memory device of claim 1,
wherein the second correction circuit is further configured to, based on the size of the first reference data of the plurality of reference data being larger than the reference unit interval, generate a second offset clock signal from among the plurality of offset clock signals, by delaying the phase of a second clock signal of the plurality of clock signals by an offset, and provide the generated second offset clock signal to the control circuit,
wherein a size of the offset corresponds to a difference between the size of the first reference data and the reference unit interval.

8. The memory device of claim 1, further comprising:
a first repeater configured to provide the plurality of clock signals from the first correction circuit to the second correction circuit; and
a second repeater configured to provide the plurality of corrected clock signals from the first correction circuit to the driver.

9. An operating method of a memory device, the operating method comprising:
generating, based on a first reference clock signal and a second reference clock signal, a plurality of clock signals;
generating, based on a size of each of a plurality of reference data included in a first data signal, a plurality of offset clock signals;
generating a plurality of corrected clock signals by adjusting, based on the plurality of offset clock signals, phases of the plurality of clock signals; and
outputting, based on the plurality of corrected clock signals, a second data signal including data stored in the memory device,
wherein the generating of the plurality of offset clock signals comprises comparing a size of a first reference data with a reference unit interval.

10. The operating method of claim 9, wherein the generating of the plurality of clock signals comprises:
generating, based on the first reference clock signal, a first clock signal of the plurality of clock signal and a third clock signal of the plurality of clock signals, each having a longer period than a period of the first reference clock signal; and
generating, based on the second reference clock signal, a second clock signal of the plurality of clock signals and a fourth clock signal of the plurality of clock signals, each having a longer period than a period of the second reference clock signal.

11. The operating method of claim 9, further comprising reading a plurality of data stored in the memory device,
wherein the reading comprises:
reading a first data of the plurality of data from a rising edge of a first corrected clock signal of the plurality of corrected clock signals to a rising edge of a second corrected clock signal of the plurality of corrected clock signals;
reading a second data of the plurality of data from the rising edge of the second corrected clock signal to a rising edge of a third corrected clock signal of the plurality of corrected clock signals;
reading a third data of the plurality of data from the rising edge of the third corrected clock signal to a rising edge of a fourth corrected clock signal of the plurality of corrected clock signals; and reading a fourth data of the plurality of data from the rising edge of the fourth corrected clock signal to the rising edge of the first corrected clock signal.

12. The operating method of claim 9, wherein the generating of the plurality of offset clock signals comprises generating a first offset clock signal having a same phase as a first clock signal of the plurality of clock signals.

13. The operating method of claim 9, wherein the generating of the plurality of offset clock signals comprises:
advancing, based on the size of the first reference data being smaller than a size of the reference unit interval, the phase of a second clock signal of the plurality of clock signals by an offset corresponding to a difference between the reference unit interval and the size of the first reference data; and
generating a second offset clock signal of the plurality of offset clock signals in which the phase of the second clock signal is advanced.

14. The operating method of claim 9, wherein the generating of the plurality of offset clock signals comprises:
delaying, based on the size of the first reference data being larger than a size of the reference unit interval, the phase of a second clock signal of the plurality of clock signals by an offset corresponding to a difference between the reference unit interval and the size of the first reference data; and
generating a second offset clock signal of the plurality of offset clock signals in which the phase of the second clock signal is delayed.

15. A memory system comprising:
a memory controller configured to generate a first reference clock signal, a second reference clock signal, and a first control signal; and
a memory device configured to provide a first data signal and a second data signal to the memory controller,
wherein the memory device comprises:
a memory cell array configured to store a plurality of data;
a clock buffer circuit configured to generate a plurality of clock signals, based on the first reference clock signal and the second reference clock signal;
a first correction circuit configured to receive the plurality of clock signals and a second control signal, adjust phases of the plurality of clock signals based on the second control signal, and output a plurality of corrected clock signals;
a second correction circuit configured to receive the plurality of clock signals through the first correction circuit, adjust the phases of the plurality of clock signals based on the first control signal, and output a plurality of offset clock signals;
a control circuit configured to generate the second control signal based on the plurality of offset clock signals received from the second correction circuit; and
a driver configured to output, based on the plurality of corrected clock signals received from the first correction circuit, the second data signal including the plurality of data read from the memory cell array, and
wherein the memory controller is further configured to generate, based on a size of each of a plurality of reference data included in the first data signal, the first control signal to adjust the phases of the plurality of clock signals,
wherein the phases of the plurality of clock signals are adjusted, by the second correction circuit, based on a comparison of a size of a first reference data of the plurality of reference data with a reference unit interval.

16. The memory system of claim 15, wherein, from among the plurality of corrected clock signals, a phase difference between a second corrected clock signal and a first corrected clock signal corresponds to 90 degrees, wherein, from among the plurality of corrected clock signals, a phase difference between a third corrected clock signal and the first corrected clock signal corresponds to 180 degrees, and wherein, from among the plurality of corrected clock signals, a phase difference between a fourth corrected clock signal and the first corrected clock signal corresponds to 270 degrees.

17. The memory system of claim 15, wherein the memory device is further configured to:

read a first data of the plurality of data from a rising edge of a first corrected clock signal of the plurality of corrected clock signals to a rising edge of a second corrected clock signal of the plurality of corrected clock signals, read a second data of the plurality of data from the rising edge of the second corrected clock signal to a rising edge of a third corrected clock signal of the plurality of corrected clock signals, read a third data of the plurality of data from the rising edge of the third corrected clock signal to a rising edge of a fourth corrected clock signal of the plurality of corrected clock signals, and read a fourth data of the plurality of data from the rising edge of the fourth corrected clock signal to the rising edge of the first corrected clock signal.

18. The memory system of claim 15, wherein the second correction circuit is further configured to generate a first offset clock signal of the plurality of offset clock signals having a same phase as a first clock signal of the plurality of clock signals.

19. The memory system of claim 15, wherein the second correction circuit is further configured to, generate a second offset clock signal from among the plurality of offset clock signals, based on the size of the first reference data of the plurality of reference data being smaller than the reference unit interval, by advancing the phase of a second clock signal of the plurality of clock signals by an offset, and provide the generated second offset clock signal to the control circuit, wherein a size of the offset corresponds to a difference between the reference unit interval and the size of the first reference data.

20. The memory system of claim 15, wherein the second correction circuit is further configured to, generate the second offset clock signal from among the plurality of offset clock signals, based on the size of the first reference data of the plurality of reference data being larger than the reference unit interval, by delaying the phase of a second clock signal of the plurality of clock signals by an offset, and provide the generated second offset clock signal to the control circuit, wherein a size of the offset corresponds to a difference between the size of the first reference data and the reference unit interval.

* * * * *